United States Patent [19]

Mercurio

[11] 4,135,009
[45] Jan. 16, 1979

[54] BENZOIC ACID TERMINATED OLIGOESTERS AS MELT FLOW MODIFIERS OF THERMOPLASTIC COATINGS AND POWDERS

[75] Inventor: Andrew Mercurio, Ambler, Pa.

[73] Assignee: Rohm and Haas Company, Philadelphia, Pa.

[21] Appl. No.: 635,514

[22] Filed: Nov. 26, 1975

[51] Int. Cl.$^2$ .................. G08G 63/18; G08L 67/06
[52] U.S. Cl. .................... 427/195; 528/305; 427/27; 427/185; 427/385 R; 427/385 A; 427/388 R; 427/397; 260/16; 260/873; 106/180; 428/480
[58] Field of Search ............... 427/385, 388 R, 195, 427/27, 185, 385 R, 385 A, 397; 260/873, 76; 228/480

[56] References Cited

U.S. PATENT DOCUMENTS

| | | | |
|---|---|---|---|
| 2,689,799 | 9/1954 | Albus et al. | 106/181 X |
| 3,574,789 | 4/1971 | Bungs et al. | 260/873 |
| 3,668,277 | 6/1972 | Riemhofer et al. | 260/873 |
| 3,850,871 | 11/1974 | Walus | 260/31.6 |
| 3,867,480 | 2/1975 | Fujiyoshi et al. | 260/873 |
| 3,953,644 | 4/1976 | Camelon et al. | 427/195 X |
| 3,954,901 | 5/1976 | Watanabe et al. | 427/195 |

Primary Examiner—Ralph S. Kendall
Attorney, Agent, or Firm—Harold L. Greenwald

[57] ABSTRACT

The application discloses a mixture of high molecular weight hard resins, such as polymethyl methacrylate, cellulose acetate butyrate and cellulose nitrate with low molecular weight benzoic acid terminated polyesters having a glass transition temperature in the range of −30° C. to 40° C. and a molecular weight in the range of 500 to 1500. The hard polyesters of this invention are obtained by the use of small diols and hard dibasic acids in addition to termination of the chain by the hardening component benzoic acid. Saturated linear dicarboxylic acids are used for less than half of the acid monomer content, on a molar basis, since these are softening components. The polyesters are used to lower the melting point and improve the flow of the high molecular weight polymers without excessively plasticizing these high molecular weight polymers to the point where they are noticeably softened at use temperatures. In contrast, the usual polyesters contain high amounts of saturated dicarboxylic acids and are terminated with saturated fatty acids. The mixture is useful for coatings applied in the form of a powder, a solution or a dispersion. Molded and cast articles can also be made from this mixture. As used herein, "thermoplastic" includes thermosetting resins which go through a thermoplastic flowable stage before becoming thermoset.

25 Claims, No Drawings

BENZOIC ACID TERMINATED OLIGOESTERS AS MELT FLOW MODIFIERS OF THERMOPLASTIC COATINGS AND POWDERS

This invention relates to the use of low molecular weight benzoic acid terminated polyesters to lower the softening point and improve the melt flow of hard high molecular weight polymers. The hard polyesters of this invention improve the melt flow of the modified polymer yet result in a final article of manufacture which, at use temperature, is not appreciably softened.

In the preparation of high molecular weight hard polymers for various uses, a common practice in the art is to add esters and polyesters to produce a more flowable product. These esters and polyesters are identified as plasticizers and are required to be: compatible with the hard polymer, stable, low in volatility, resistant to oxidation, resistant to leaching by water, and low in odor. A melt flow modifier differs from other plasticizers in having a further requirement, i.e., compared to its unmodified state, the modified hard polymer is more flowable at an elevated processing temperature and little changed in hardness at the temperature at which the final product, e.g., a coated article, is used. Polyesters of the prior art are often too soft and plasticizing, resulting in excessive thermoplasticity at use temperatures, which may be as high as 100° C., unless they are used in amounts too low to give the desired reduction in melt viscosity at processing temperatures.

It has now been found that hard polyesters terminated with benzoic acid, having a molecular weight preferably in the range of 500 to 1500 and a glass transition temperature in the range of −30° C. to +40° C., preferably −20° C. to 0° C., can be used to modify high molecular weight hard resins or polymers so that the melt viscosity thereof is lowered and the melt flow index is lowered without adversely affecting the hardness of the high molecular weight polymers at the temperature at which the final product, e.g., coated article or molded article, is used. These compositions have a number of uses, such as in reflow lacquers, powder coatings, molding powders and organisols. For example, the high molecular weight hard resin, such as an acrylic or cellulose ester automobile lacquer, is modified in such a way that the melt and flow properties are improved and yet the final lacquer coating is not plasticized to any appreciable extent and thus retains the hardness and exposure resistance of the coating resin. Those skilled in the art will recognize the many advantages which accrue from the lowered melt viscosity, such as:

(a) shorter time cycles in plant operation,
(b) lower bake oven temperatures required,
(c) less thermal stability needed for the hard polymer,
(d) improved coverage of difficultly coated objects such as those with reentrant angles,
(e) improved surface finish of both coated and molded objects.

The major way in which the oligoesters of this invention differ from prior art plasticizers is the use of both dibasic aromatic acids in the chain and benzoic acid as chain terminator, thereby increasing softening points to more desirable ranges for melt flow modifiers. Moreover, only limited ranges of optimized molecular weights, limited selections of diols and aliphatic dibasic acids that do not soften excessively, and limited compositional structures that do not detract seriously from exterior durability (e.g., avoid ethers, aromatic groups except those with mono- or dicarboxylic acid substituents, unsaturation, halogen substituents, etc.) are utilized.

This invention further relates to the described compositions formulated into powder coatings, lacquers containing organic solvents, dispersions in aqueous or organic liquids, and molding powders, and to methods of coating articles by applying films of these formulations to said articles and to the products of the coating operation or molding operation employing the described compositions. In addition to the melt flow modifier and the hard high molecular weight polymer, the formulations may contain solvents, non-solvent liquids, pigments, antistatic agents and other materials to achieve the desired effects.

OLIGOESTER

The oligoesters of this invention result from the condensation of substantially the following components: (a) a diol, (b) a dibasic cyclic acid, (c) benzoic acid or cyclohexanoic acid and, optionally, (d) a dibasic linear aliphatic acid. Reactant ratios for the condensation and reaction conditions are chosen so as to produce oligoesters in which nearly all chain terminals are benzoate or cyclohexanoate groups. The ratio of aliphatic to aromatic dibasic acid content is chosen so as to result in oligoesters with glass transition temperatures in the range of −30° C. to +40° C., with the range −20° C. to 0° C. being preferred.

The diols, also known as glycols, advantageously employed to form the oligoesters are: ethylene glycol, 1-2 propane diol, 1-3 propane diol, 1-2 butane diol, 1-3 butane diol, 1-4 butane diol, 1-3 isobutane diol, all the dihydroxy isomers of butane in which the hydroxyl groups are on different carbon atoms including 1-2 isobutane diol, 2-3 butane diol, neopentyl glycol, all the cyclohexane diol isomers in which the hydroxyl groups are on different carbon atoms including 1-4 cyclohexane diol, 1-3 cyclohexane diol, 1-2 cyclohexane diol and cyclohexane dimethanol. In the above listing, the short glycol names ethylene glycol and neopentyl glycol correspond to 1-2 ethane diol and 1-3 dimethyl propane diol respectively. Higher alkyl diols are avoided because they produce oligomers that tend to be too soft. Ether diols, such as those obtained by condensing ethylene oxide or propylene oxide with a diol, are avoided because they detract from exterior durability as well as soften excessively.

Benzoic acid is the preferred monocarboxylic acid, but hydrogenated benzoic acid, i.e., cyclohexanoic acid may be substituted for any portion of the benzoic acid. Long chain monobasic fatty acids of prior art are avoided because they produce oligomers that tend to be too soft. Substituted analogs of benzoic acid are avoided because they tend to detract from exterior durability. The benzoic acid can be incorporated by transesterification from an ester of a relatively low boiling monoalcohol, if desired. Substituted cyclohexanoic acid or other substituted saturated isocyclic carboxylic acids, such as campholic acid, do not detract from exterior durability and are useful in these polyesters.

The preferred dibasic cyclic acids are preferably isocyclic dicarboxylic acids selected from the group: orthophthalic acid (or phthalic anhydride), isophthalic acid, and terephthalic acid. The acids may be added as esters of relatively low boiling monoalcohols, in which case they are incorporated by transesterification reactions instead of esterification reactions. Substituted analogs of these acids are avoided because they tend to show decreased exterior durability. Hydrogenated analogs of the acids can be utilized, however, such as hexahydrophthalic acid. The benzoic acid terminated polyester resin has as its dibasic acid component a minimum of 50 mole percent of an isocyclic dicarboxylic acid having 8 to 10 carbon atoms and is preferably an aromatic acid.

For the dibasic aliphatic acid, malonic acid, succinic acid glutaric acid and adipic acid are preferred to reduce the melting points or rigidity of the polyesters in question, when needed. Oxalic acid is not an effective "softener" and it tends to volatilize during high temperature condensation synthesis. Analogs with longer aliphatic chain length than adipic acid tend to soften excessively. It is preferred than 0 to 50 mole percent of the dibasic acid be a linear aliphatic acid selected from the group malonic acid, succinic acid, glutaric acid and adipic acid. However, when the polyester resin is based on the diol neopentyl glycol, up to 67 mole percent of the dibasic acid is selected from the group malonic acid, succinic acid, glutaric acid and adipic acid.

The polyesters of this invention are low in molecular weight, thus are sometimes referred to as oligoesters, ranging from 500 to 1500 in number average molecular weight. This range of molecular weights is chosen to avoid volatility of the polyester component during processing of the mix with the high molecular weight polymer while retaining good efficiency to reduce melt viscosity. The achievement of lowered melt viscosity and melt flow index without adversely affecting the hardness of the finished product is in significant measure due to the proper selection of the glass transition temperature, Tg, range of the polyester. Polyesters, as described above, having a glass transition temperature in the range $-30°$ C. to $+40°$ C. are used to produce mixtures, with the high molecular weight thermoplastic resins or blends of these, having the appropriate melt viscosity and flow index and finished product hardness. A preferred Tg range is $-20°$ C. to $0°$ C.

HIGH MOLECULAR WEIGHT RESINS

Among the high molecular weight resins which may be modified by the oligomers of the invention are the alkyds including the drying or non-drying oil-modified alkyds, rosin-modified alkyds, mixed or co-reactive alkyds and epoxy resins, mixed or co-reactive alkyd-/aminoplast/epoxy resins, mixed or co-reactive epoxidized esters of higher fatty acids with aminoplast resins, cellulose esters such as cellulose nitrate, cellulose acetate butyrate, cellulose acetate, and cellulose acetate propionate; nylons such as nylon 11 and nylon 12; epoxies such as the linear polymers derived from epichlorohydrin and bisphenol A and the epoxy acrylates; polysulfides, acetal polymers, polycarbonates, polysulfones, polyphenylene oxide, polyimides, polyxylylenes, silicones such as the polymer having repeating dimethylsilicone units; polyolefins such as polypropylene; other vinyl resins such as polystyrenes; hard acrylics such as copolymers of 40 to 99.5 percent methyl methacrylate with another acrylic acid or methacrylic acid ester, and optionally, up to 50 percent of functional monomers containing amine, amide, carboxyl, hydroxy, or other known functional groups which may promote compatibility or adhesion, mentioned heretofore; polyhalo-olefins such as polytetrafluoroethylene, polyvinyl chloride; polyesters such as the unsaturated polyester derived from maleic anhydride, phthalic anhydride, and ethylene glycol; and so forth. The hard coating resins are well-known for powder coatings; the present invention being to modify them with the melt viscosity reducing component so that smooth uniform coatings can be obtained at a lower temperature than normal fusion temperature.

Representative high molecular weight resins will now be described. These can be used alone or in admixture with other high molecular weight resins.

Cellulose acetate butyrate is representative of the cellulose esters. It preferably has 16 to 40 percent of the hydroxyl groups in a glucose unit esterified with butyric acid and from 10 to 30 percent of such hydroxyl groups esterified by acetic acid. In the following specification, this is referred to as a cellulose acetate butyrate containing 16 to 40 percent butyryl and 10 to 30 percent acetyl. For some uses, it is preferred that this ester contains 24 to 28 percent butyryl and 19 to 22 percent acetyl. The molecular weight of the cellulose ester should be such that when viscosity is determined on a 20 percent solution in a 90:10 acetone/ethanol mixture at 25° C. on a falling ball viscometer (ASTM D-1343-54T), the viscosity will be in the range from 0.01 to 5 seconds and preferably from 0.1 to 1 seconds, using a 5/16-inch steel ball falling through 10 inches in a 1-inch tube. This specification of molecular size of the cellulose acetate butyrate is commonly used in the industry and simply identifies the cellulose acetate butyrate as having a 0.01 second, a 5-second, or an intermediate viscosity. If the butyryl content is too high, it has been found that the compositions are too tacky for certain uses. On the other hand, when the butyryl content is too low, the coating has insufficient elasticity. In other uses, as in the cases where no flexing occurs, a cellulose acetate butyrate, having 12 to 14 percent acetyl and 35 to 39 percent butyryl, and a degree of substitution of about 2.7 is perfectly satisfactory.

The usual commercial cellulose nitrate, having a DS (degree of substitution) of about 1.9 to 2.3, a DP (degree of polymerization) of about 100 to 400, and about 10 to 12 percent nitrogen is useful in accordance with the invention.

Substantially any compatible hard acrylic coating resin having a Tg of from about 50° C. to about 110° C. or higher, preferably at least 65° C., is useful according to the invention. The hard acrylic coating resin has a molecular weight of from 50,000 to 200,000. The "hard" acrylic monomers, those which when homopolymerized give a high Tg, include the lower alkyl ($C_1$–$C_4$) methacrylates, acrylic acid, methacrylic acid, itaconic acid, tertamyl methacrylate, cyclohexyl acrylate or methacrylate, tertiary butyl acrylate, isobornyl methacrylate, benzyl acrylate and phenoxyethyl methacrylate. The "soft" acrylic or other monomers, or those which when homopolymerized give a low Tg, include the higher ($C_5$–$C_{15}$) methacrylates, the lower alkyl ($C_1$–$C_{13}$ alkyl) esters of acrylic acid, vinylidene chloride, ethyl thiaethyl methacrylate, and others, all as is more particularly described in U.S. Pat. Nos. 3,020,178; 2,972,592; and 2,795,564. As is known in the art, chain branching affects the Tg; the greater the branching the higher the Tg, in general. All or part of the hard acrylic monomer may be replaced by other ethylenically unsaturated hard monomers such as styrene, vinyltoluene, acrylonitrile, methacrylonitrile, vinyl acetate, or vinyl chloride. Blends of hard and soft monomers are useful in accordance with known procedures. Functional adhesion promoting monomers, including α,β-unsaturated carboxylic acids, such as acrylic acid, methylacrylic acid, itaconic acid, aconitic acid, maleic acid, half esters of the dicarboxylic acids such as maleic acid, fumaric acid, the dimer or trimer of methacrylic acid, acrylamides such as acrylamide, methacrylamide, N-methylolacrylamide, N-methacrylamide, and N-ethylolacrylamide, are permissible in the coating resin.

These polymers and the other powder coating polymers are well-known to the art.

While most of the coating resins described heretofore are thermoplastic, thermosetting resins such as the epoxies, the aminoplast-modified alkyds, and others are useful, particularly at times or temperatures before thermosetting is complete.

Among the blends of hard polymers particularly useful in this invention are blends of cellulose esters with polyacrylic resins to produce a mix wherein the cellulose ester component of the resin is present in the amount between 0 and 30% of the resin content and the polyester is from 5 to 40% of the total weight of the mix.

THE MIXTURES

In the mixtures of this invention the low molecular weight melt flow modifying polyester resin, A, is present in lesser amount than the high molecular weight resin or blend of such resins, B.

Conventional systems for coating substrates such as metals, glass, wood, etc. comprise utilizing the polymers dissolved or dispersed in liquids. The processes involving liquids have a number of disadvantages including air pollution by solvent vapors, the added cost of using the solvent as a carrier for the polymer, the ventilation and fire hazard problems, toxicity, viscosity problems requiring the use of a low solids content and the necessity to use repeated coatings to obtain a given film thickness, and so forth. Many polymers with desirable coating properties have not been successfully applied from solvent systems because of incompatibility or insolubility, examples being the nylons, polyolefins, and fluorocarbons. The present invention is useful with such methods, but powder coating is particularly preferred.

Powder coating avoids such problems and may be defined as any process which will deposit an essentially solventless powder which is capable of being fused or cured into a coherent, protective and durable coating upon any substrate, particularly conductive substrates. The powder coatings, particularly those applied to substrates which have a difference in electrostatic charge from the powder, have the advantage of providing excellent uniformity of coatings, even over edges and corners, with no sagging, orange peel, or drip marks present. The principal commercial powder coatings methods are the fluidized bed coating method, the electrostatically charged fluidized bed, and the electrostatic spray or cloud methds. Fluidized bed coating is based upon dipping a preheated object into a bed of finely divided dry coating materials, often with a postheating step to provide a smooth coating. Coatings of 5 to 50 mils can readily be obtained in this method. The electrostatic fluidized bed, spray, or cloud method normally involves providing a charge upon the particles, although the object to be coated can also be charged, followed by exposing the substrate, commonly grounded, to the mist, spray, or cloud of powdered coating resins. Usually the particles are supplied with a negative charge, although some materials such as the nylons are most useful with a positive charge. With resins which retain the charge for a long period of time, it is possible to obtain a very thin layer or coating because the layer of powder on the metal retains the charge and tends to repel additional powder particles. Uniform coatings of as low as about 1 mil are possible utilizing this method, and up to 10 to 20 mils or more are also possible. Examples of polymers which retain a charge of static electricity which is bled off slowly are the epoxies, the cellulosics and the nylons. Others lose their charge quite rapidly, the vinyl resins being an example, permitting rapid buildup of heavy layers of powder. Such powders may make it advisable to utilize a preheated object of obtain the necessary fusion of the powdered composition.

Some of the problems involved with powder coatings is that in order to achieve the necessary flow of the polymers, temperatures high enough to char the polymer, prematurely crosslink in the case of thermosetting resins, discolor the polymer, and cause other damage to the polymer are commonly necessary. While external plasticizers are a partial solution to these problems, many plasticizers are not useful for powder coatings in that they tend to cause the particles to stick together, or they may exude or be extracted from the coating on the finished article, or they may unduly soften the coating resin at the temperature of use of the coated article. The melt flow modification produced by the polyester in the mixtures of this invention makes these mixtures particularly suitable for powder coatings.

While, for certain purposes, a clear coating may be employed, it is quite general to include pigments in an amount up to 100 percent by weight of the polymer in the powder coating compositions. Examples of suitable pigments include titanium dioxide, carbon black, iron blues, phthalocyanine blues and greens; metal oxides, hydroxides, sulfides, sulfates, silicates and chromates; organic maroons, aluminum flake, bronze powders, pearl essence, and various fillers or extenders such as talc, barytes, china clay and diatomaceous earth. It will be obvious to those skilled in the organic coating art that the amount of pigment may be varied widely, depending on the effect desired. The amount of pigment, by weight based on the weight of the organic film-forming material, may vary between about 2 percent for light high-hiding pigments, such as carbon black, and about 100 percent for heavy low-hiding pigments, such as lead chromate. The method of dispersing the pigment in the powdered resins is not critical provided a uniform dispersion is produced. The pigment may be present as separate particles or may be dispersed in either the coating resin particles or the melt flow reducing polymer particles of the invention, preferably the latter.

The powder particles are produced by various methods such as cryogenic grinding, ball milling, spray drying of latices, solutions or non-aqueous dispersions, precipitation from solution, and so on. In fusing the coatings, temperatures of from about 180° C. to 500° C. are useful. With the thermosetting resins and the use of a catalyst, even lower temperatures are sometimes useful.

The hard coating resin, the oligomer, the pigment, and other materials used in the powder coatings are desirably about 10 to about 500 microns, preferably 20 to 100 microns, in cross-section, and most desirably spherical in shape. The powder must be free-flowing and be resistant to sintering to form agglomerates at the temperatures used. The final composition can be prepared either by dry-blending or melt-mixing, or solution mixing. As has been suggested heretofore, the hard powder coating resins per se form no part of the present invention, the invention being in modifying the same with the oligomer so that the combination has a low melt viscosity and is fused, with the formation of a uniform film, at a reasonably low temperature and a narrow temperature range. Useful temperatures depend upon the identity of the hard coating resin and the amount and identity of the melt flow reducing additive utilized, as well as the presence or absence of external plasticizers.

Substantially any substrate is useful. Thus, metals, wood or paper, glass, glass made conductive by a tin oxide coating, and so forth are suitable.

Although emphasis has been placed on the use of this invention in the new powder coatings technology, other important fields of utility exist. Mixtures of the instant invention are especially useful in thermoplastic reflow lacquers and in molding powders for, in both of these areas, modification of the hard thermoplastic resin to reduce melt viscosity at high temperatures without impairing mechanical properties or durability at use temperatures produces cost savings and/or the utilization of a wider range of materials with concomitant property advantages. These mixtures, when finely divided, may be applied to substrates in the form of aqueous or non-aqueous dispersions.

The following examples will further illustrate the invention and the preparation of suitable oligomers but are not intended to limit it in any way. All parts are by weight and all temperatures are in degrees Centigrade, unless otherwise noted.

EXAMPLE 1

Poly(neopentylene phthalate) Terminated With Benzoic Acid

Ingredients:
(Use ethylene glycol for excess needed to reduce the acid number.)

| Charge | Ingredient | Weight | Gm-Moles |
|---|---|---|---|
| A | phthalic anhydride | 1110 g | 7.5 |
|   | neopentyl glycol | 832 g | 8.0 |
|   | ethylene glycol | 124 g | 2.0 |
|   | benzoic acid | 122 g | 1.0 |
| B | triisooctyl phosphite | 0.5 g | |
| C | dibutyl tin oxide | 0.5 g | |
|   | water | 153 g | |
|   | Total | 2035 g | |
|   | excess ethylene glycol | −124 g | 2.0 |
|   | Yield | 1911 g | |

Process:

Charge ingredients A to a 3-liter, 3-neck flask equipped with stirrer (vacuum tight), nitrogen sparge (near bottom), thermometer, 5-bulb steam heated Allyn condenser topped with a distillation head equipped with a thermoregulator set for maximum distillation temperature of 102° C. Heat to 110°-120° C. until clear with a 0.1 standard cubic feet per hour (SCFH) nitrogen flow, steam on condenser and with the flask well insulated. Reduce nitrogen flow to 0.05 SCFH and add ingredient B. Mix well, then add ingredient C. Start agitation as soon as mixture can be conveniently stirred. Hold at 130°-140° C. for one hour. Gradually raise temperature to 180° C. over a period of 3 hours while distilling off water (watch for sublimation and solid in distillate - slow down heating schedule if there is much solid noted). After 1 hour at 180° C., continue heating to a pot temperature of 210° C. and hold until vapor temperature falls below 97° C. Use a steamjacketed condenser wrapped with aluminum foil to cut down drafts that provide cooling. Increase nitrogen sparge to 0.1 SCFH and slowly raise pot temperature to 220° C. When vapor temperature falls below 97° C., increase nitrogen sparge to 0.5 SCFH and hold until acid number is below 12 (about 6 hours). Regrease all joints and seal stirrer bearing. Cool to 210° C. and slowly reduce pressure to 100 mm Hg (watch for foaming or sublimation). Hold for 4 hours. Unless excessive sublimation and solid material is distilling, reduce the pressure to 10 mm and hold until about 100-125 g of ethylene glycol have been collected, otherwise hold at 100 mm Hg. The acid number should be less than one. Keep tight system for light color. If product is solid or too high in viscosity for GardnerHoldt viscosity, adjust temperature to 75° C. and run Brookfield viscosity. Provided sample is sufficiently fluid at 125° C., filter. The product is a clear yellow glass material with an acid number of 0.36.

EXAMPLE 2

A Neopentyl Adipate-Phthalate Polyester

| Ingredients: charge | Ingredient | Weight | Gm-Moles |
|---|---|---|---|
| A | neopentyl glycol | 457.6 g | 4.4 |
|   | adipic acid | 146 g | 1.0 |
|   | phthalic anhydride | 296 g | 2.0 |
|   | benzoic acid | 244 g | 2.0 |
| B | dibutyl tin oxide | 0.2 g | |
|   | water | 108 g | |
|   | Total | 1035.6 g | |
|   | excess glycol | −41.6 g | |
|   | Yield | 994.0 g | |

Process:

Following essentially the same procedure as in Example 1, heat ingredients A until clear (115°-130° C.), add catalyst (B), use a steam-jacketed condenser, and heat to 140° C. until water starts to distill. Reduce N₂ to 0.05 SCFH. Heat slowly (3 hours) to 180° C., then to 210° C. - hold until vapor temperature drops below 98° C. Increase N₂ to 0.1 SCFH when vapor temperature falls below 98° C., and raise temperature to 220° C.; when vapor temperature again falls below 98° C., increase N₂ to 0.5 SCFH. The product has an acid number of 0.78, a viscosity of 6300 centipoise (Brookfield), and a color of 1⁻ on a varnish color scale.

EXAMPLES 3 and 4

Ethylene Adipate-Phthalate Polyesters

| Ingredients: | | Example 3 | | Example 4 | |
|---|---|---|---|---|---|
| Charge | Ingredient | Weight | Gm-Moles | Weight | Gm-Moles |
| A | ethylene glycol | 620 g | 10.0 | 750.6 g | 12.1 |
|   | adipic acid | 292 g | 2.0 | 353.5 g | 2.4 |
|   | phthalic anhydride | 592 g | 4.0 | 716.7 g | 4.8 |

-continued

| | | Example 3 | | Example 4 | |
|---|---|---|---|---|---|
| Charge | Ingredient | Weight | Gm-Moles | Weight | Gm-Moles |
| B | benzoic acid | 488 g | 4.0 | 590.8 g | 4.8 |
| | dibutyl tin oxide | 0.3 g | | 0.4 g | |
| | water | 216 g | | 261.5 g | |
| | excess glycol | −124 g | 2.0 | −150.1 g | 2.4 |
| | Yield | 1652 g | | 2000 g | |

Process:

The process of Example 1 is used, and the products obtained are characterized as follows:

| | Ex. 3 | Ex. 4 |
|---|---|---|
| Acid No. | 0.21 | 0.40 |
| Viscosity (cps - 25° C.) | 1070 | 910 |
| Color (varnish color scale) | 1+ | 1− |
| Hydroxyl no. | 23.8 | 36.0 |

EXAMPLE 5

Screening Melt Flow Modifiers

The screening formulation is a baked coating formulation of 30% titanium dioxide and 70% organic compounds by weight solids. The organic compounds are a poly(methyl methacrylate) with a weight average molecular weight about 110,000 blended with the oligoester being tested at a 70/30 solids ratio. Simple tests for softening at elevated temperature have been used to gauge the severity of deformation that will be encountered under use conditions. As a point of departure, these simple tests are calibrated by applying them to oligoesters of known performance.

The "Cheesecloth Print Test" is run by placing a piece of cheesecloth on the surface of the coating which is on a steel panel. Weight is placed on the cheesecloth to develop a 2 PSI pressure. Such an assembly is then placed in an oven at the indicated temperature for thirty minutes. After this treatment, various coatings are ranked visually for degree of imprint by the cheesecloth.

| Example | Ester | Cheesecloth Print at 140° F. |
|---|---|---|
| 5a | butyl benzyl phthalate | definite imprint |
| 5b | isodecyl benzyl phthalate | definite imprint |
| 5c | oligoester of ethylene glycol and a 2 to 1 molar ratio of phthalic to adipic acids that is terminated with $C_8$ to $C_{10}$ saturated fatty acids; Tg = −77° C., $\overline{M}_n$ = 780. | definite imprint |

In further screening tests, it is found that on exposure to 100% relative humidity at 100° F., these coatings show excessive dulling; and on exposure in Florida, the coatings show water spotting.

EXAMPLE 6

Cheesecloth Print Test of Oligoesters

Oligoesters made by the process of Example 1 are formulated in the screening formulation of Example 5 and tested by the "Cheesecloth Print Test" of Example 5. The following table lists the diol, the dibasic acids and the terminal acid of the polyester, as well as the results of the test. From the results, it is clear that the phthalicrich benzoic acid terminated polyesters outperform the other esters tested in the 140° F. "Cheesecloth Print Test."

| | | Cheesecloth Print at 140° F. Using Oligoesters | | | |
|---|---|---|---|---|---|
| Example | Diol | Moles of Phthalic Anhydride | Moles of Adipic Acid | Terminating Acid | Cheesecloth Print, 140° F |
| 6a | ethylene glycol (EG) | 2 | 1 | $C_8$ to $C_{10}$ fatty acids | definite imprint |
| 6b | propylene glycol (1-2PG) | None | All | Benzoic Acid | Same as 6a |
| 6c | EG | 1 | 2 | Benzoic Acid | Slightly better than 6a |
| 6d | EG | 2 | 1 | Benzoic Acid | Noticeably better than 6a |
| 6e | 1-3 butylene glycol (1-3BG) | 2 | 1 | Benzoic Acid | Equal to 6d |

Notes:
1. Example 6a uses the same polyester as in Example 5C.
2. The number average molecular weight, Mn, of the polyester of Example 6b is 1385.
3. The polyester of Example 6d has a Mn of 707 and a Tg of −19° C.

EXAMPLE 7

Egg Albumin Spotting Test

Using the screening formulation of Example 5, on oligoesters made by the process of Example 1, the "Egg Albumin Spotting Test" is run by placing a puddle of 1% egg albumin solution in water on the surface of the coating which is on a steel panel. While still wet, the panel is placed horizontally in an oven at the indicated temperature for thirty minutes. After this treatment, the coating is washed with tap water, dried, hand polished with DuPont No. 7 Auto Polish, and then wiped clean with a soft flannel cloth. Finally, the various coatings are ranked visually for degree of permanent etching caused by the egg albumin solution. The "Egg Albumin Spotting Test" is more severe than the "Cheesecloth Print Test" not only because it is run at higher temperature but also because it is run under wet conditions and water may tend to plasticize the compositions. This test serves to differentiate among the polyesters of the instant invention. Other polyesters fail this test so badly that the test does not give differentiating results when applied to those others, e.g., the first examples of Example 6.

The following table lists the diol, the dibasic acids and the terminal acid of the polyester, as well as the results of the test. Examples 7a and 7b are inferior to Examples 7c and 7d in this test. However, it is found that overlapping the panels with methyl ethyl ketone, to simulate a recoating operation, produces crazing on the panels of Examples 7c and 7d but not on that of Example 7a. Thus 7a is the polyester of choice when used with the specific high molecular weight hard resin of the test formulation. With other high molecular weight thermoplastic resins, as for example acrylic copolymers with lower glass temperatures, formulations made with the polyesters of Examples 7c and 7d produce coatings which do not craze in the simulated recoating operation.

| Ex. | Diol | Moles of Phthalic Anhydride | Moles of Adipic Acid | Terminating Acid | Egg Albumin Spotting at 160° F. |
|-----|------|------|------|------|------|
| 7a | EG | 2 | 1 | Benzoic | Heavy |
| 7b | 1-3 BG | 2 | 1 | Benzoic | Heavy |
| 7c | 1-2 PG | 2 | 1 | Benzoic | Medium |
| 7d | EG | All | None | Benzoic | Medium |

Notes:
1. Example 7a uses the same polyester as Example 6d.
2. Example 7b uses the same polyester as Example 6e.

EXAMPLE 8

Exposure Tests

Screening formulation coatings are made using the polyesters of Examples 6a and 6d. The coatings based on the Example 6d polyester consistently have better resistance to dulling when exposed to 100% relative humidity at 100° F. or to Weather-O-Meter exposure (120° F., periodic water spray, xenon arc radiation). This superiority is also noted in coatings in which other high molecular weight thermoplastic resins, such as methyl methacrylate/n-butyl methacrylate copolymers and methyl methacrylate/isobutyl methacrylate copolymers, both with glass transition temperatures above 50° C., than the poly(methyl methacrylate) of the screening formulation are used. It should be noted that in this teaching, the term "thermoplastic resin" includes not only permanently thermoplastic coating resins but resins which go through a thermoplastic state and are flowable to form coatings which ultimately become thermoset.

EXAMPLE 9

Hardness, Print, Cold Cycling and Powder Flow

In this example, the screening formulation is modified by the use of another hard resin and by varying the amount of melt flow modifier used, as will be seen in the table below. The results recorded in the table are for the following tests:

KHN

Knoop hardness number is obtained from a surface indentation measurement by a Tukon instrument.

Print

A piece of cheesecloth is placed on the coating and covered with a 2 square inch circular leather disk. A weight is placed on top of the disk, resulting in an applied pressure of two PSI. The assembly (several test specimens may be stacked) is placed in an oven at the desired temperature for a specified time, here two hours. After the assembly has cooled to room temperature, the weight is removed and the panels are rated for degree of imprinting by the cheesecloth. A numerical scale for rating from 0 equals no print to 10 equals heavy print and 10++ severely heavy print.

Cold Cycling

Sections of coated panel (1½" × 44") are subjected to substrate/coating relative strains induced by rapid and extreme variations in temperature. One cycle consists of:

a. immersion for three minutes in an ethylene glycol-water mixture (3:1 by volume) maintained at −60° F. with aid of a Dry Ice/acetone bath, followed by, b. immersion in a water bath at 150° F. for three minutes, and c. examination for cracking of the coating after it has cooled to room temperature.

The number of cycles passed, up to 10, is recorded.

Powder Flow

Powder obtained from films of the coating is ground to pass 20 mesh. Piles of the powder, 0.1 to 0.2 grams, are heated for 30 minutes at the stated temperature and, after cooling, are rated for flow on a scale of 0 equals no change to 8 equals excellent flow to form a smooth glossy surface.

It is seen, in the table, that an ester of low molecular weight softens the final coating excessively and that too high a polyester modifier content tends to do the same.

| | | Acrylic Resin (Tg - 55° C.) Plus Polyester Modifiers | | | | | | | | | |
|---|---|---|---|---|---|---|---|---|---|---|---|
| | | %[3] | | Print (2 psi/2hrs) | | Cold | Powder Flow (30'/° F) | | | | |
| Example | Modifier | Modifier | KHN | 120° F | 140° F | Cycles | 300 | 325 | 350 | 375 | 400 | 425 |
| 9a | NPP | 40 | 16 | 8 | 10 | 10 | 4 | | 5 | 6 | 7 | 8 |
| 9b | NPP | 50 | 14 | 9 | 10 | 10 | 4 | | 5 | 8 | 8 | |
| 9c | NPP | 60 | 12 | 10 | 10++ | 10 | 5 | 6 | 8 | 8 | | |
| 9d | (6d) | 30 | 2 | 10 | 10+ | 10 | 4 | | 5 | 6 | 7 | 7 |
| 9e | S-278 | 30 | 1 | 10++ | 10+++ | 10 | 3–4 | 5 | 6 | 7 | 7 | 8 |
| 9f | (6a) | 30 | <0.5 | 10+ | 10++ | 10 | 3 | | 5 | 5 | 6 | 7–8 |

Notes:
1. Intrinsic viscosity of Acrylic resin in acetone = 0.94; $\overline{M}_w$ slightly below one million.
2. Modifier NPP is benzoic acid terminated poly(neopentylene phthalate), $\overline{M}_n$ = 1330, Tg - 25° C.
   Modifier (6d) is the polyester of Example 6d, $\overline{M}_n$ = 707, Tg - 19° C.
   Modifier S-278 Santicizer 278 (Monsanto Chem.), a benzyl phthalate ester, $\overline{M}_n$ = 470, Tg - 45° C.
   Modifier (6a) is the polyester of Example 6a, $\overline{M}_n$ = 780.
[3]Percent based on total solids of the final mixture.

EXAMPLE 10

Cellulose Acetate Butyrate/Acrylic Resin Systems

Tests of the type described in Example 9 were performed on blends of an acrylic resin having a Tg about 95° C. and an $M_w$ about 75,000; a cellulose acetate butyrate resin (CAB resin), Eastman Chemical CAB resin EAB 381-2 having 13.5% acetyl, 37% butyryl, a hardness of 12 KHN, and a melting range of 171°–185° C.; and the polyester modifier of Example 6d with $M_n$ of 707. An improved balance of properties, especially powder flow with little sacrifice in hardness, produced by the polyester modifier is noted.

| Modified Acrylic Resin - CAB Blends | | | | | | |
|---|---|---|---|---|---|---|
| % CAB[1] | 0 | 0 | 20 | 0 | 20 | 10 |
| % Modifier[1] | 0 | 20 | 0 | 30 | 30 | 40 |
| Hardness KHN | 25 | 21 | 19 | 19 | 22 | 11 |
| Cold Cycles Passed | 3 | 3 | 1 | 3 | 5 | 5 |
| Print: | | | | | | |
| 140° F. | 0 | 3 | 0 | 7 | 7 | 10 |
| 160 | 0 | 5 | 0 | 7 | 10 | 10+ |
| 180 | 0 | — | 0 | — | — | — |
| 200 | 0 | — | 0 | — | — | — |
| 220 | 3 | — | 3 | — | — | — |
| 240 | 10 | — | 8 | — | — | — |
| Powder Flow: | | | | | | |
| 275° F. | 2 | 5 | 1 | 7 | 6 | 7 |
| 300 | 3 | 7 | 2 | 7 | 7 | 8 |
| 325 | 4 | 8 | 4 | 8 | 7 | — |
| 350 | 6 | — | 5 | — | 8 | — |
| 375 | 6 | — | 6 | — | — | — |

[1]Percents based on total solids of the final mixture.

EXAMPLE 11

Effect of Molecular Weight of Acrylic Resin

Acrylic resins, with Tg about 95° C., are prepared at varying molecular weights as noted in the table for this example. For convenience, the viscosity average molecular weight, $M_v$, is tabulated. The viscosity average molecular weight is a little lower than the weight average molecular weight for the given polymer. Except where indicated by a footnote, the modifier is the polyester of Example 6d, $M_n = 707$ and $Tg = -19°$ C. In several cases, duplicate readings are indicated in the table by being separated by commas. The test methods are described in Example 9.

With the aid of the table, modified compositions are chosen in which the properties are balanced for the particular end-use application. The advantages of the modified system are clear throughout the table. For example, in the data of the first two columns, it is seen that 10% of the polyester improves the powder flow at low fluxing temperatures without a change in hardness or ambient temperature range print resistance. Throughout the table, the improvement in melt flow with moderate change in hardness is evidenced. Where too great an amount of melt flow modifier, i.e., 60% with the acrylic with $M_v$ of 128,000, is used, the hardness drops to very low values.

| Effect of Molecular Weight of Acrylic Resins | | | | | | | | | | | | | | | |
|---|---|---|---|---|---|---|---|---|---|---|---|---|---|---|---|
| Acrylic $M_V$ | 50,000 | | | 65,000 | | | 87,000 | | | | 104,000 | | | | |
| Modifier Wt. % (of total) | 0 | 10 | 20 | 0 | 20 | 30 | 0 | 25 | 25[1] | 30 | 40 | 0 | 30 | 40 | 50 |
| Hardness (KHN) | 24 | 24 | 24 | 25 | 25 | 19 | 27 | 21,21 | 22 | 22,17 | 15 | 24 | 19 | 14 | 8 |
| Cold Cycles Passed, 2 mils | 0 | 1 | 2 | 3 | 3 | 3 | 10 | 10,10 | 10 | 10,10 | 10 | 10 | 10 | 10 | 10 |
| Print: 140° F | 0 | 0 | 3 | 0 | 3 | 7 | 0 | 6,3 | 2 | 7,8 | 9 | 0 | 5 | 9 | 10 |
| 160 | 0 | 0 | 6 | 0 | 5 | 7 | 0 | 9,5 | 4 | 9 | — | 0 | 8 | 10+ | 10+ |
| 180 | 0 | 3 | — | 0 | — | — | 0 | — | — | — | — | 0 | — | — | — |
| 200 | 0 | 7 | — | 0 | — | — | 0 | — | — | — | — | 0 | — | — | — |
| 220 | 4 | — | — | 3 | — | — | 3 | — | — | — | — | 2 | — | — | — |
| 240 | 10 | — | — | 10 | — | — | 9 | — | — | — | — | 6 | — | — | — |
| Powder Flow: 275° F | — | — | — | — | — | 4 | — | — | — | — | 4 | — | — | — | 5 |
| 300 | 2 | 3 | 6 | 2 | 5 | 7 | 1 | 4,— | 3 | 5,5 | 7 | 1 | 3 | 5 | 7 |
| 325 | 4 | 6 | 7 | 3 | 7 | 7 | 2 | 6,— | 6 | 6,7 | 7 | 2 | 6 | 6 | 8 |
| 350 | 7 | 8 | 8 | 4 | 8 | 8 | 3 | 8,— | 7 | 8,8 | 8 | 3 | 7 | 7 | — |
| 375 | 8 | — | — | 6 | — | — | 4 | — | 8 | — | — | 3 | 8 | 8 | — |
| 400 | — | — | — | 6 | — | — | 5 | — | 8 | — | — | 4 | — | — | — |
| 425 | — | — | — | — | — | — | — | — | — | — | — | 5 | — | — | — |
| Acrylic $M_V$ | 128,000 | | | | | | | | 122,000 | | | | | | |
| Modifier Wt. % (of total) | 0 | 40 | 50 | 60 | 0 | 40 | 50 | 35[1] | 40 | 40[2] | 40[3] | 25[4] | 40[4] | | |
| Hardness (KHN) | 21,25 | 9 | 4,6 | 2,3 | 21,21 | 15,9 | 4,6 | 17 | 14 | 3,6 | 24,26 | 18,23 | 22,11 | | |
| Cold Cycles Passed, 2 mils | 10 | 10 | 10 | 10 | 10 | 10,10 | 10 | 10 | 10 | 10 | 10 | 10 | 10,10 | | |
| Print: 140° F | 0 | 10 | 10+ | 10+ | 0 | 9,9 | 9 | 6 | 8 | 10 | 0 | 0 | 2,9 | | |
| 160 | 0 | — | — | — | 0 | 10+,10+ | 10+ | 9 | 10 | 10+ | 0 | 0 | 7 | | |
| 180 | 0 | — | — | — | 0 | — | — | — | — | — | 0 | 5 | — | | |
| 200 | 0 | — | — | — | 0 | — | — | — | — | — | 0 | 8 | — | | |
| 220 | 1 | — | — | — | 2 | — | — | — | — | — | 3 | — | — | | |
| 240 | 6 | — | — | — | 7 | — | — | — | — | — | 5 | — | — | | |
| Powder Flow: 275° F | — | — | — | 6 | — | — | 5 | — | — | 4 | — | — | 6,6 | | |
| 300 | 1 | 5 | 6 | 8 | 1 | 5 | 7 | 4 | — | 6 | 2 | 3 | 7,8 | | |
| 325 | 1 | 7 | 8 | — | 2 | 6 | 8 | 6 | — | 7 | 2 | 5 | 8 | | |
| 350 | 2 | 8 | — | — | 3 | 8 | — | 8 | — | 8 | 3 | 6 | — | | |
| 375 | 3 | — | — | — | 4 | — | — | 8 | — | — | 3 | 7 | — | | |
| 400 | 4 | — | — | — | 4 | — | — | — | — | — | 5 | 8 | — | | |
| 425 | 4 | — | — | — | 5 | — | — | — | — | — | 6 | — | — | | |
| Acrylic $M_V$ | 50,000 | | | | 110,000 | | | | | | | | | | |
| Modifier Wt. % (of total) | 0 | 10 | 0 | 30 | 40 | 40[1] | | | | | | | | | |
| Hardness (KHN) | 21,23 | 22,24 | 21,23 | 17 | 11,13 | 14 | | | | | | | | | |
| Cold Cycles Passed, 2mils | 1 | 1 | 10 | 10 | 10 | 10 | | | | | | | | | |
| Print: 140° F | 0 | 0 | 0 | — | 9 | 8 | | | | | | | | | |
| 160 | 0 | 0 | 0 | — | 10+ | 10 | | | | | | | | | |
| 180 | 0 | 1 | 0 | — | — | — | | | | | | | | | |
| 200 | 0 | 6 | 0 | — | — | — | | | | | | | | | |
| 220 | 4 | — | 1 | — | — | — | | | | | | | | | |
| 240 | 10 | — | 8 | — | — | — | | | | | | | | | |
| Powder Flow: 275° F | — | — | — | — | — | — | | | | | | | | | |

-continued
Effect of Molecular Weight of Acrylic Resins

| | | | | | | |
|---|---|---|---|---|---|---|
| 300 | 2 | 3 | 1 | 5 | 6 | — |
| 325 | 4 | 5 | 2 | 8 | 8 | — |
| 350 | 6 | 7 | 3 | 8 | — | — |
| 375 | 8 | 8 | 4 | — | — | — |
| 400 | — | — | 6 | — | — | — |
| 425 | — | — | — | — | — | — |

NOTES:
1. A polyester substituting neopentyl glycol for the ethylene glycol of the polyester of Example 6a. It has an Mn of 740 and a Tg of −11° C.
2. The polyester of Example 6a, Mn of 780 and Tg −77° C.
3. Neopentyl glycol dibenzoate, Mn is 312.
4. Senticizer 278 (Monsanto) A branched glycol benzyl phthalate with Mn = 471 and Tg −45° C.

I claim:
1. In a composition comprising a mixture of:
A. a low molecular weight polyester resin and
B. a hard high molecular weight resin or blend of such resins,
A being present in lesser amount than B, the improvement wherein the polyester resin is
(1) benzoic acid or saturated isocyclic monocarboxylic acid terminated,
(2) a melt flow modifying polyester resin having as its dibasic acid component a minimum of 50 mole percent of an isocyclic dicarboxylic acid having 8–10 carbon atoms and
(3) a polyester having a glass transition temperature between −30° C. and +40° C., and a number average molecular weight between 500 and 1500;
thus modifying the high molecular weight resin to be more flowable at an elevated processing temperature and little changed in hardness at the temperature of use.

2. The composition of claim 1 in which B is a high molecular weight thermoplastic resin or blend of such resins.

3. The mixture of claim 2 wherein B is a high molecular weight thermoplastic resin or blend of such resins selected from the group consisting of cellulose esters, nylons, epoxies, silicones, polysulfides, vinyl resins, acetal polymers, polycarbonates, polysulfones, polyphenylene oxide, polyimides, polyxylylenes, polyolefins, polyvinylhalides, acrylics, polyhaloolefins, alkyds, and polyesters, and A is a benzoic acid terminated polyester resin.

4. The composition of claim 3 in which the benzoic acid terminated polyester resin has a glass transition temperature between −20° C. and 0° C.

5. The composition of claim 3 in which the benzoic acid terminated polyester resin has a diol component selected from the group consisting of ethylene glycol, 1-2 and 1-3 propane diol, all of the dihydroxy isomers of butane and the cyclohexane diol isomers in which the hydroxyl groups are on different carbon atoms, neopentyl glycol, and cyclohexane dimethanol.

6. The composition of claim 3 in which the isocyclic dicarboxylic acid is an aromatic acid.

7. The composition of claim 3 in which 0 to 50 mole percent of the dibasic acid is selected from the group consisting of malonic acid, succinic acid, glutaric acid and adipic acid.

8. The composition of claim 7 in which the resin is a cellulose ester, a polyacrylic resin having a weight average molecular weight of from 50,000 to 2,000,000 or blends thereof.

9. The composition of claim 8 in which the glass transition temperature of the acrylic polymer is between 50° C. and 110° C., the cellulose ester component of the resin is present in the amount between 0 and 30% of the resin content and the polyester is from 5 to 40% of the total weight of the mix.

10. The composition of claim 3 in which the benzoic acid terminated polyester resin is based on the diol neopentyl glycol, and a minimum of 33 mole percent of an isocyclic dicarboxylic acid having 8 to 10 carbon atoms.

11. The composition of claim 3 in which the resin is a cellulose ester, a polyacrylic resin having a weight average molecular weight of from 50,000 to 2,000,000 or blends thereof.

12. The composition of claim 11 in which the glass transition temperature of the acrylic polymer is between 50° C. and 110° C., the cellulose ester component of the resin is present in the amount between 0 and 30% of the resin content and the polyester is from 5 to 40% of the total weight of the mix.

13. A lacquer containing an organic solvent and the composition of claim 12 in solution therein.

14. The composition of claim 13 in powder form.

15. A dispersion of particles of the composition of claim 12 in an aqueous or organic liquid.

16. The composition of claim 3 in which the melt flow modifying polyester resin is terminated by hydrogenated benzoic acid.

17. A lacquer containing an organic solvent and the composition of claim 3 in solution therein.

18. The composition of claim 3 in the form of a powder.

19. A dispersion of particles of the composition of claim 3 in aqueous or organic liquid.

20. In a method of coating an article, the steps of applying a film of the composition of claim 17 to an article and curing the same.

21. In a method of coating an article, the steps of applying a film of the composition of claim 18 to an article and curing the same.

22. In a method of coating an article, the steps of applying film of the composition of claim 13 to an article and curing the same.

23. In a method of coating an article, the steps of applying a film of the composition of claim 14 to an article and curing the same.

24. In a method of coating an article, the steps of applying a film of the composition of claim 19 to an article and curing the same.

25. In a method of coating an article, the steps of applying a film of the composition of claim 15 to an article and curing the same.

* * * * *

UNITED STATES PATENT AND TRADEMARK OFFICE
CERTIFICATE OF CORRECTION

PATENT NO. : 4,135,009
DATED : January 16, 1979
INVENTOR(S) : Andrew Mercurio

It is certified that error appears in the above-identified patent and that said Letters Patent are hereby corrected as shown below:

Column 3, line 17, change "than" to read -- that --.

Column 5, line 3, change "methylacrylic" to read -- methacrylic --.

Column 5, line 55, change "coatings" to read -- coating --.

Column 5, line 58, change "methds" to read -- methods --.

Column 6, line 15, change "of obtain" to read -- to obtain --.

Column 6, line 64, change "coatings" to read -- coating --.

Column 8, line 29, change "glass" to read -- glassy --.

Column 8, Example 2, line 42, excess glycol under heading GM - Moles insert -- 0.4 --.

Column 10, Example 6, under heading diol - 6a, change "(EC)" to read -- EG --.

Column 11, line 11, change "overlapping" to read -- overspraying --.

Column 12, line 9, change "The results" to read -- The test results --.

Column 12, line 18, change "(several test)" to read -- (several test --.

Column 12, line 28, change "(1-1/2" X 44")" to read -- (1-1/2" X 4") --.

UNITED STATES PATENT AND TRADEMARK OFFICE
CERTIFICATE OF CORRECTION

PATENT NO. : 4,135,009
DATED : January 16, 1979
INVENTOR(S) : Andrew Mercurio

It is certified that error appears in the above-identified patent and that said Letters Patent are hereby corrected as shown below:

Column 12, chart, Note 1, change "slighly" to read -- slightly --.

Column 12, chart, Note 2, change "(Mosanto Chem.)" to read -- (Monsanto Chem.) --.

Signed and Sealed this

First Day of September 1981

[SEAL]

*Attest:*

*Attesting Officer*

GERALD J. MOSSINGHOFF

*Commissioner of Patents and Trademarks*